United States Patent
Hada et al.

[19]

[11] Patent Number: 6,157,892
[45] Date of Patent: Dec. 5, 2000

[54] OBSTACLE AVOIDANCE CONTROL SYSTEM FOR VEHICLE

[75] Inventors: Satoshi Hada; Yoichi Sugimoto; Yoshihiro Urai; Shoji Ichikawa, all of Wako, Japan

[73] Assignee: Honda Giken Kogyo Kabushiki Kaisha, Tokyo, Japan

[21] Appl. No.: 09/329,307

[22] Filed: Jun. 10, 1999

[30] Foreign Application Priority Data

Jun. 11, 1998 [JP] Japan .................................. 10-163612

[51] Int. Cl.[7] ............................... G01S 13/93; B60T 8/00
[52] U.S. Cl. ......................... 701/301; 701/96; 342/455; 340/903; 340/436; 180/169
[58] Field of Search .................... 701/70, 93, 96, 701/301; 342/454, 455; 340/901, 903, 435, 436; 180/167–170, 176–179; 123/352

[56] References Cited

U.S. PATENT DOCUMENTS

| | | | |
|---|---|---|---|
| 5,388,048 | 2/1995 | Yavnayi et al. | 701/96 |
| 5,467,283 | 11/1995 | Butsuen et al. | 701/301 |
| 5,572,428 | 11/1996 | Ishida et al. | 701/301 |
| 5,574,644 | 11/1996 | Butsuen et al. | 701/301 |
| 5,629,851 | 5/1997 | Williams et al. | 701/96 |
| 5,771,007 | 6/1998 | Arai et al. | 701/301 |
| 5,878,361 | 3/1999 | Sekine et al. | 701/96 |
| 5,955,967 | 9/1999 | Yamada | 701/96 |
| 5,978,731 | 11/1999 | Matsuda | 701/301 |

FOREIGN PATENT DOCUMENTS

7-21500  1/1995  Japan .

*Primary Examiner*—Gary Chin
*Attorney, Agent, or Firm*—Arent Fox Kintner Plotkin & Kahn, PLLC

[57] ABSTRACT

The avoidance of an obstacle by a vehicle is enhanced by effective balancing an automatic braking operation and a turnability increasing control operation assisting in a steering operation of the vehicle whereby the obstacle avoiding capability is enhanced to the maximum. If a vehicle is being automatically controlled and the steering operation is carried out by the driver and if it is determined an obstacle can be avoided by a turnability increasing control operation, and if an avoiding space exists in a direction of turning of the vehicle, the turnability increasing control operation is carried out to perform the avoidance of the obstacle by the steering operation. If no avoiding space exists in the direction of turning of the vehicle, the avoidance of the obstacle by the steering operation is not performed, and a stability increasing control operation is carried out to effectively perform the avoidance of the obstacle by the automatic braking operation.

6 Claims, 6 Drawing Sheets

OBSTACLE AVOIDANCE CONTROL SYSTEM FOR VEHICLE

BACKGROUND OF THE INVENTION

1. Field of the Invention

The present invention relates to an obstacle avoidance control system for a vehicle, wherein braking devices are automatically operated to avoid the contact of the vehicle with an obstacle, based on the relative positions of the vehicle and the obstacle detected by an obstacle detecting means such as a laser radar and the like.

2. Description of the Prior Art

Such an obstacle avoidance control system for a vehicle is already known, for example, from Japanese Patent Application Laid-open No. 7-21500. This obstacle avoidance control system is designed so that when a driver operates a steering wheel during an automatic braking operation to avoid the contact of the vehicle with the obstacle, braking forces for left and right wheels are individually controlled to generate a yaw moment, thereby assisting in the steering operation provided by the driver. The assisting in the steering operation is carried out, only when it is impossible to avoid the obstacle with the automatic braking operation only, due to a small distance between the vehicle and the obstacle.

In the above known system, when it is determined that it is possible to avoid the obstacle with the automatic braking operation only, the obstacle is avoided by recourse to the automatic braking operation only, without carrying-out a turnability increasing control operation which assists in the steering operation. However, it is very difficult to precisely determine whether it is possible to avoid the obstacle by the automatic braking operation, because the determination is governed largely by uncertain factors such as the friction coefficient of the road surface existing ahead of the vehicle and the like. Therefore, in the above known system, even when the obstacle can be avoided if the turnability increasing control operation assisting in the steering operation is carried out, there is the possibility of the generation of a situation in which the obstacle cannot be avoided with recourse to the automatic braking operation only.

SUMMARY OF THE INVENTION

The present invention has been accomplished with the above circumstance in view, and it is an object of the present invention to ensure that the avoidance of the obstacle by the automatic braking operation and the avoidance of the obstacle with the turnability increasing control operation, assisting in the steering operation, are determined effectively, whereby the obstacle avoiding capability is enhanced to the maximum.

To achieve the above object, there is provided an obstacle avoidance control system for a vehicle, comprising an obstacle detecting device for detecting an obstacle existing ahead of a vehicle in the direction of movement of the vehicle, a contact-possibility determining means for determining whether there is a possibility that the vehicle will contact the obstacle, based on the result of the determination provided but the obstacle detecting device, and an automatic braking means for carrying out an automatic braking operation, when the contact-possibility determining means determines that there is a possibility that the vehicle will contact the obstacle. The obstacle avoidance control system further includes a steering operation detecting means for detecting the steering operation provided by the driver, a vehicle behavior control means for assisting in the steering operation of the driver to enhance the turnability of the vehicle, and an avoidance-possibility or impossibility determining means for determining whether it is possible to avoid the obstacle by the operation of the vehicle behavior control means, when the steering operation detecting means detects the steering operation of the driver during the automatic braking operation by the automatic braking means. When the avoidance-possibility or impossibility determining means determines that it is possible to avoid the obstacle, the operation for avoiding the obstacle by the vehicle behavior control means is permitted.

With the above arrangement, when the driver performs the steering operation during the automatic braking operation by the automatic braking means, if it is possible to avoid the obstacle by the turnability increasing control operation provided by the vehicle behavior control means, the carrying-out of the turnability increasing control operation is permitted. Therefore, the reliable obstacle avoiding operation based on the driver's intention can be maximized to effectively prevent the contact of the vehicle with the obstacle, while effectively balancing the avoidance of the contact provided by the automatic braking operation and the avoidance of the contact provided by the steering operation.

The obstacle avoidance control system further includes an avoiding space detecting device for detecting whether an avoiding space exists in a direction for the vehicle to travel to avoid the obstacle, whereby when the avoiding space detecting device determines that the avoiding space exists, the operation for avoiding the obstacle by the vehicle behavior control means is permitted.

With the above arrangement, the operation for avoiding the obstacle by the vehicle behavior control means is permitted, only when an avoiding space exists in a direction for the vehicle to travel to avoid the obstacle. Therefore, when no avoiding space exists, the wasteful avoiding operation can be prevented from being carried out.

Further, when the avoiding space detecting means determines that no avoiding space exists, the vehicle behavior control means performs an operation for inhibiting the change in behavior of the vehicle.

With the above arrangement, when it is impossible to avoid the obstacle by the steering operation due to no space existing in a direction for the vehicle to travel to avoid the obstacle, the vehicle behavior control means performs an operation for suppressing a change in behavior of the vehicle. Therefore, the stability of the straight movement of the vehicle can be enhanced, and the braking effect by the automatic braking operation can be exhibited effectively to reliably avoid the obstacle.

Still further, the vehicle behavior control means enhances the turnability of the vehicle by changing the distribution of the braking forces to the left and right sides.

With the above arrangement, a difference can be provided between braking forces for left and right wheels of the vehicle to generate a yaw moment, and the turnability of the vehicle can be enhanced by such yaw moment.

The vehicle behavior control means also enhances the turnability of the vehicle by steering rear wheels.

With the above arrangement, the turnability of the vehicle can be enhanced by steering the four wheels, i.e., by steering the rear wheels in addition to the steering of the front wheels.

The vehicle behavior control means also enhances the turnability of the vehicle by changing the distribution of the rolling rigidities to the front and rear sides.

With this arrangement, the turnability of the vehicle can be enhanced by providing a difference between the rolling rigidity of the suspensions for front wheels and the rolling rigidity of the suspensions for rear wheels.

BRIEF DESCRIPTION OF THE DRAWINGS

The mode for carrying out the present invention will now be described by way of an embodiment shown in the accompanying drawings.

FIGS. 1 to 8 show an embodiment of the present invention, wherein

DETAILED DESCRIPTION OF THE PREFERRED EMBODIMENT

Figure 1:
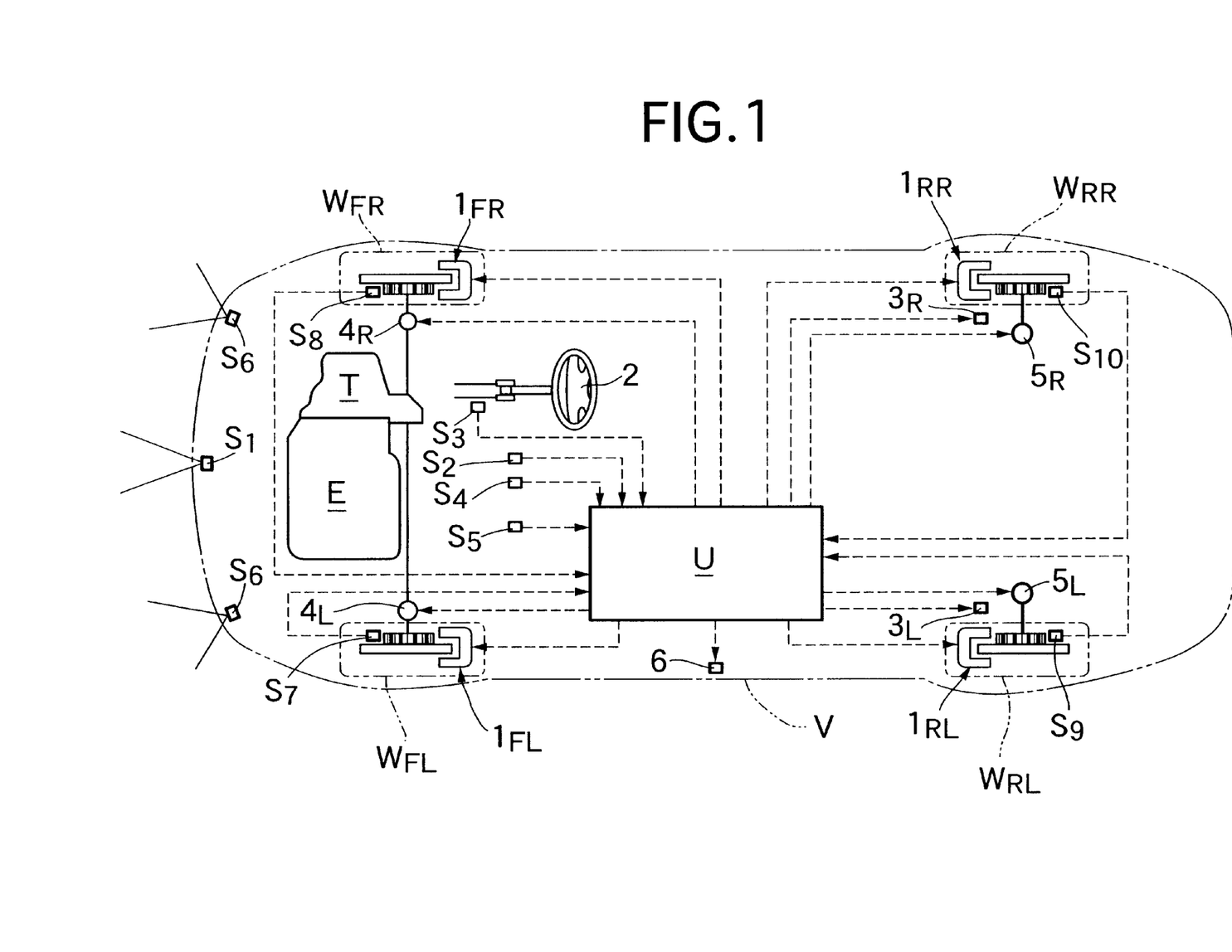
FIG. 1 is an illustration of the entire arrangement of a vehicle having an obstacle avoidance control system mounted thereon.
Figure 2:
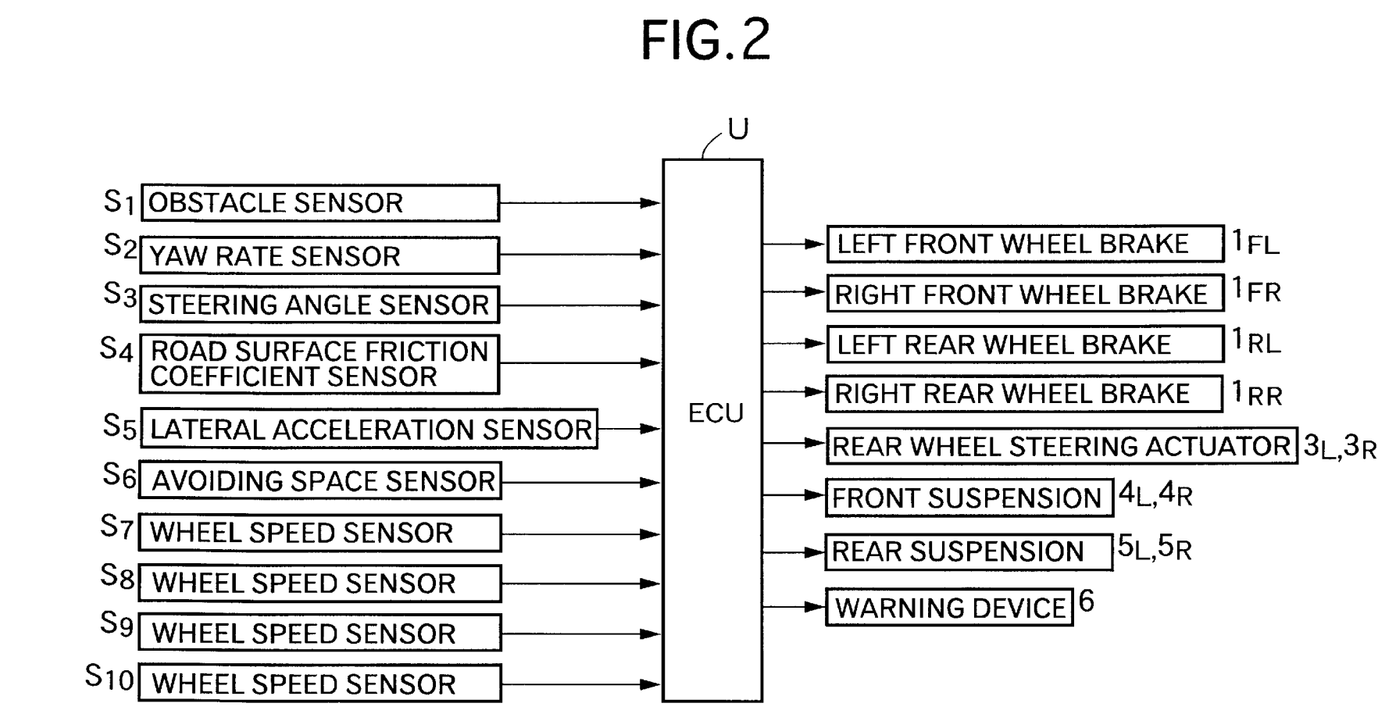
FIG. 2 is a block diagram of the obstacle avoidance control system of the embodiment of the present invention.

As shown in FIGS. 1 and 2, a vehicle V having an obstacle avoidance control system of the present invention carried thereon, includes left and right front wheels $W_{FL}$ and $W_{FR}$ which are driven wheels connected to an engine E through a transmission T, and left and right rear wheels $W_{RL}$ and $W_{RR}$ which are follower wheels. The braking forces for the front wheels $W_{FL}$ and $W_{FR}$ and the rear wheels $W_{RL}$ and $W_{RR}$ are individually controlled by brake devices $1_{FL}$, $1_{FR}$, $1_{RL}$ and $1_{RR}$ mounted on these wheels. The vehicle V also includes a four-wheel steering mechanism. The front wheels $W_{FL}$ and $W_{FR}$ can be steered by the operation of a steering wheel 2, and the rear wheels $W_{RL}$ and $W_{RR}$ can be steered by rear wheel steering actuators $3_L$ and $3_R$. The rolling rigidity of each of the front suspensions $4_L$ and $4_R$ for suspending the front wheels $W_{FL}$ and $W_{FR}$ and rear suspensions $5_L$ and $5_R$ for suspending the rear wheels $W_{RL}$ and $W_{RR}$ can be controlled by changing the spring constant of a suspension spring, the damping force of a damper, the rigidity of a stabilizer and the like.

Signals from an obstacle sensor $S_1$, a yaw rate sensor $S_2$, a steering angle sensor $S_3$, a road surface friction coefficient sensor $S_4$, a lateral acceleration sensor $S_5$, avoiding space sensors $S_6$, $S_6$, a wheel speed sensor $S_7$ for the left front wheel $W_{FL}$, a wheel speed sensor $S_8$ for the right front wheel $W_{FR}$, a wheel speed sensor $S_9$ for the left rear wheel $W_{RL}$ and a wheel speed sensor $S_{10}$ for the right rear wheel $W_{RR}$, are all input to an electronic control unit U for controlling the operations of the brake devices $1_{FL}$, $1_{FR}$, $1_{RL}$ and $1_{RR}$, the rear wheel steering actuators $3_L$ and $3_R$, the front suspensions $4_L$ and $4_R$, the rear suspensions $5_L$ and $5_R$ and a warning device 6 comprising a buzzer or a lamp. The electronic control unit U performs automatic control for automatically operating the brake devices $1_{FL}$, $1_{FR}$, $1_{RL}$ and $1_{RR}$ in order to avoid contact of the vehicle with an obstacle, based on the signals from the sensors $S_1$ to $S_{10}$, and controls the operations of the brake devices $1_{FL}$, $1_{FR}$, $1_{RL}$ and $1_{RR}$, the rear wheel steering actuators $3_L$ and $3_R$, the front suspensions $4_L$ and $4_R$ and the rear suspensions $5_L$ and $5_R$ in order to assist in the driver's steering operation to enhance the turnability of the vehicle. The warning device 6 is operated during execution of the automatic control, to inform a driver of a possibility of contact of the vehicle with an obstacle.

Figure 4:
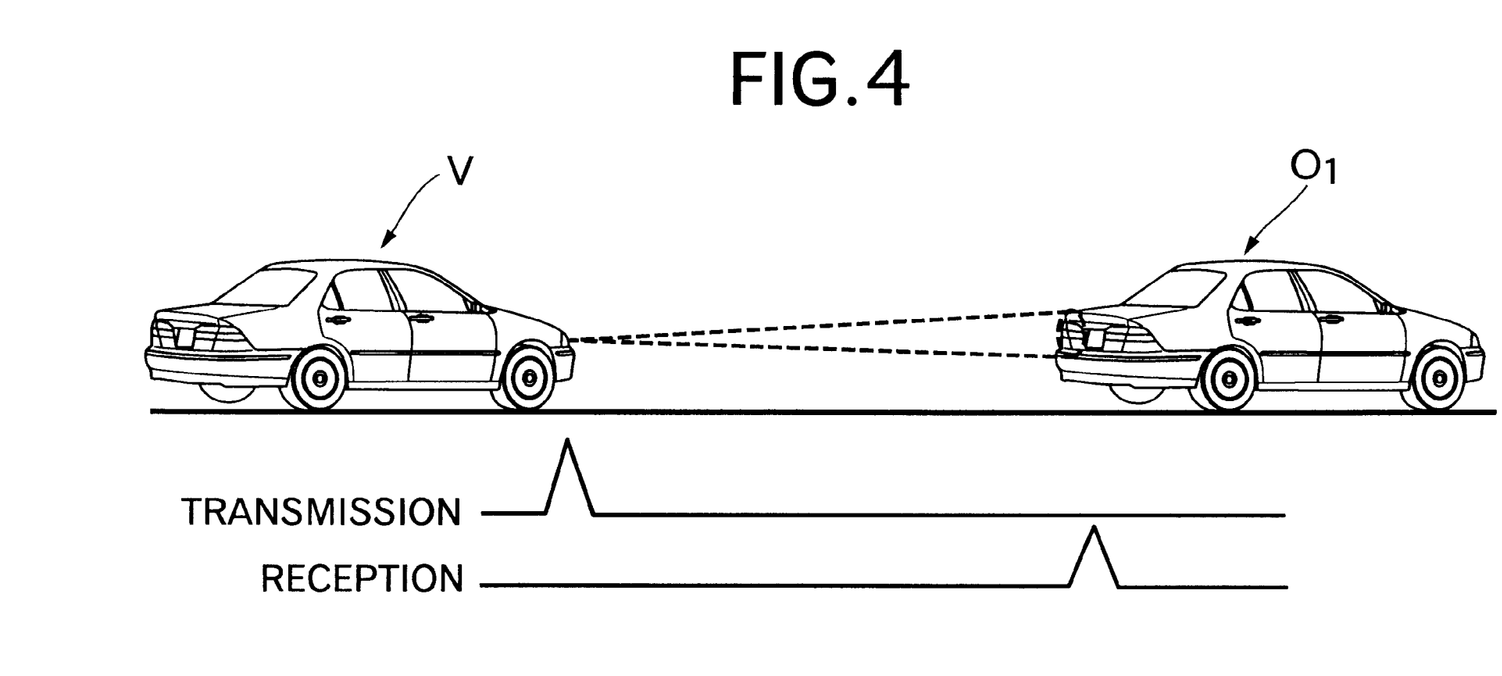
FIG. 4 is a view for explaining an obstacle sensor.
Figure 5:
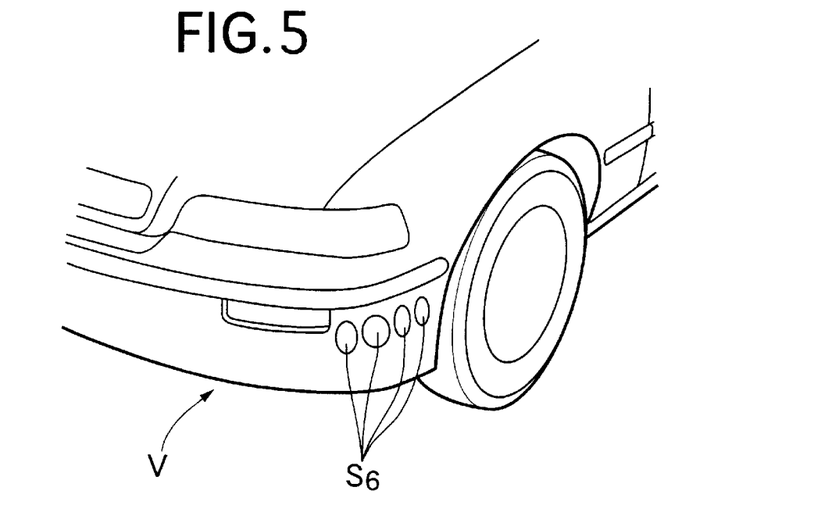
FIG. 5 is a view for explaining an avoiding space sensor.
Figure 6:
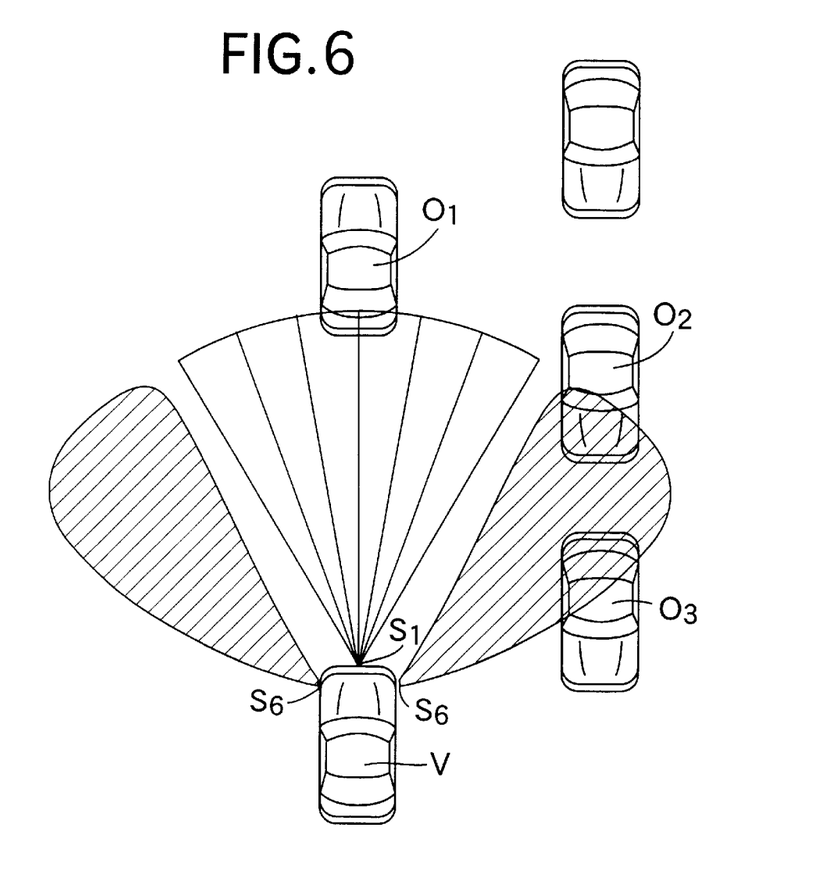
FIG. 6 is a view for explaining the operation of the obstacle sensor and the avoiding space sensor.

As shown in FIGS. 4 and 6, the obstacle sensor $S_1$ is comprised of a laser radar mounted at the front end of the vehicle V and arranged to receive a laser wave transmitted forwards from the vehicle and reflected by an obstacle $O_1$ which is, for example, a vehicle traveling ahead of the vehicle (which will be referred to as a preceding vehicle hereinafter) in order to detect the relative distance between the vehicle and the obstacle $O_1$ and the relative speed between the vehicle and the obstacle $O_1$ in the direction of the obstacle $O_1$. As shown in FIGS. 5 and 6, each of the avoiding space sensors $S_6$, $S_6$ is comprised of a plurality of laser radars disposed radiantly at the left and right front ends of the vehicle V, and is mounted to detect whether an avoiding space (an area indicated by the oblique lines) exists obliquely ahead of the vehicle V, when the vehicle V avoids the obstacle $O_1$ ahead of the vehicle V by the steering operation. When the steering wheel 2 is operated to the left, the avoiding space sensor $S_6$ located on the left side of a vehicle body is operated. When the steering wheel 2 is operated to the right, the avoiding space sensor $S_6$ located on the right side of the vehicle body is operated. FIG. 6 shows a case where no avoiding space exists to the right of the vehicle V due to the presence of obstacles $O_2$ and $O_3$, and an avoiding space exists to the left of the vehicle V.

Figure 3:
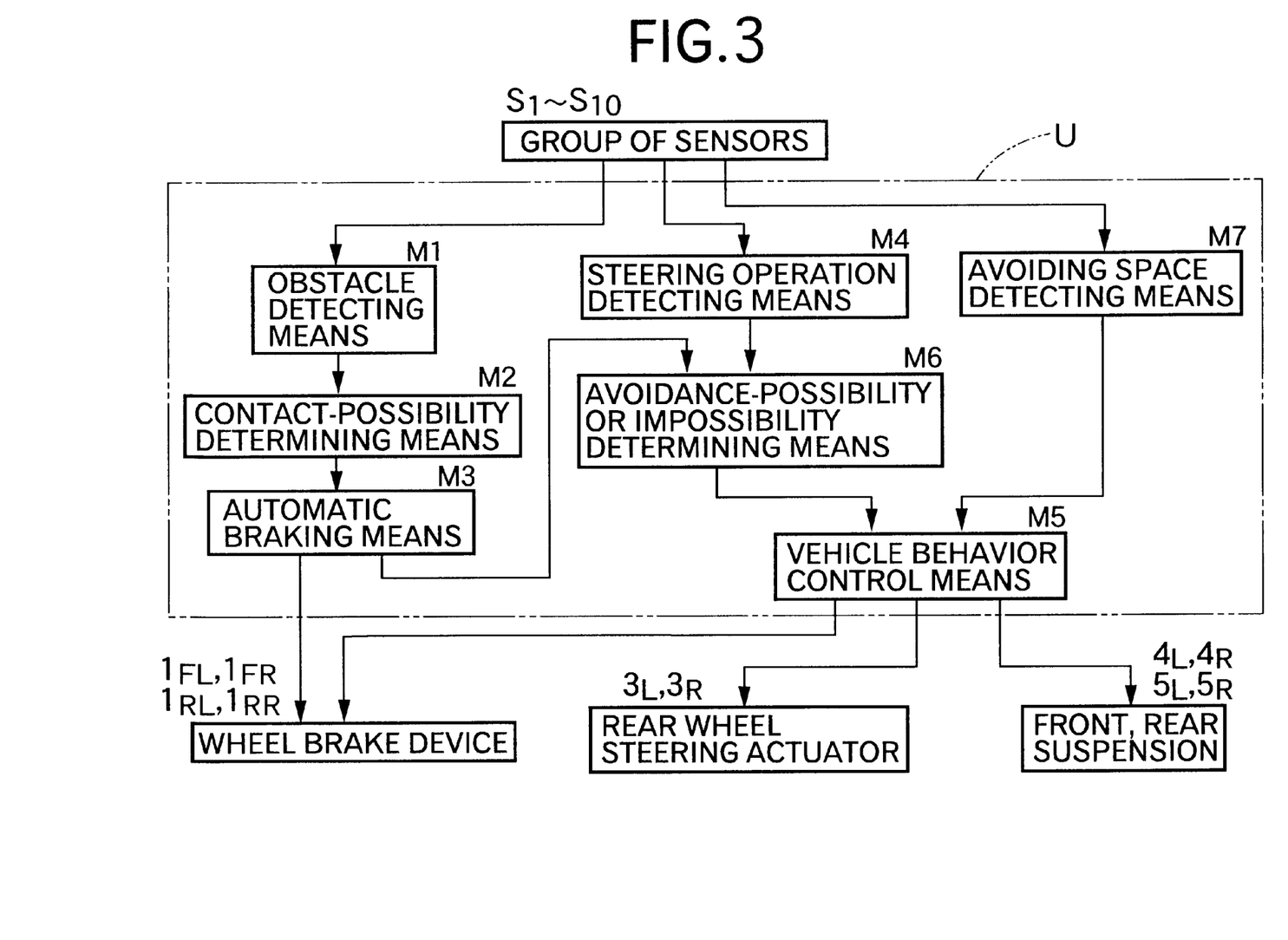
FIG. 3 is a block diagram showing a circuit arrangement of an electronic control unit.

As shown in FIG. 3, the electronic control unit U is comprised of circuits for an obstacle detecting means M1, a contact-possibility determining means M2, an automatic braking means M3, a steering operation detecting means M4, a vehicle behavior control means M5, an avoidance-possibility or impossibility determining means M6 and an avoiding space detecting means M7.

The operation of the embodiment of the present invention will be described below.

The automatic braking operation will be described first. The obstacle detecting means M1, to which the signal from the obstacle sensor $S_1$ is input detects the relative distance and speed between the vehicle and an obstacle ahead of the vehicle and the direction of such obstacle. The contact-possibility determining means M2 determines whether there is a possibility that the vehicle will contact the obstacle, if it maintains the current operative state, based on the relative distance and speed and the direction of the obstacle which have been detected by the obstacle detecting means M1. In this case, the vehicle speed detected by the wheel speed sensors $S_7$ to $S_{10}$, the yaw rate detected by the yaw rate sensor $S_2$, the steering angle detected by the steering angle sensor $S_3$, the road surface friction coefficient detected by the road surface friction coefficient sensor $S_4$, the lateral acceleration detected by the lateral acceleration sensor $S_5$ and the like, are taken into consideration.

When there is the possibility that the vehicle will contact the obstacle as a result of the determination of the contact possibility, the automatic braking device M3 operates the brake devices $1_{FL}$, $1_{FR}$, $1_{RL}$ and $1_{RR}$ for the front wheels $W_{FL}$ and $W_{FR}$ and the rear wheels $W_{FL}$ and $W_{RR}$ to carry out the automatic braking operation in order to avoid contact of the vehicle with the obstacle. This automatic braking operation may be carried out by operating an electronic control vacuum booster by a command from the electronic control unit U to generate a hydraulic braking pressure in a master cylinder, or by operating a hydraulic pump by a command from the electronic control unit U to generate the hydraulic braking pressure.

When there is the possibility that the vehicle will contact the obstacle, the brake devices $1_{FL}$, $1_{FR}$, $1_{RL}$ and $1_{RR}$ are automatically operated to avoid the contact of the vehicle with the obstacle, even if the driver does not carry out a spontaneous braking operation.

Now, when the signal from the steering angle sensor $S_3$ connected to the steering wheel 2 is input to the steering operation detecting means M4, the steering operation detecting means M4 detects the operation of the steering wheel 2 provided by the driver. If the steering operation detecting means M4 detects the operation of the steering wheel 2 provided by the driver when the automatic braking operation is being carried out by the automatic braking means M3, the avoidance-possibility or impossibility determining means M6 determines that the driver has the intention of avoiding the obstacle by a steering operation, and it is determined whether it is possible to avoid the obstacle by a turnability increasing control operation (which will be described hereinafter) carried out by the vehicle behavior control means M5.

Techniques for determining whether there is a possibility of avoidance of the obstacle include a technique using a mathematical operation and a technique using a map. The contents of these techniques will be described below.

1. Technique Using A Mathematical Operation (1) A future locus of movement of the obstacle is presumed from the state of the obstacle detected by the obstacle sensor $S_1$;

(2) A future locus of movement of the vehicle is presumed when the automatic braking operation and the turnability increasing control operation are to be carried out;

(3) A future locus of movement of the vehicle is presumed when only the automatic braking operation is to be carried out, but the turnability increasing control operation is not to be carried out;

(4) If the loci of movement in the items (1) and (3) are superposed on each other and the turnability increasing control operation is not to to be carried out, the avoidance of the obstacle may be impossible. If the loci of movement in the items (1) and (3) are not superposed on each other and the turnability increasing control operation is to be carried out, the avoidance of the obstacle is possible. In both of such cases, the avoidance-possibility or impossibility determining means M6 determines if the avoidance of the obstacle is possible, thereby permitting the carrying-out of the turnability increasing control operation if necessary.

Figure 7:
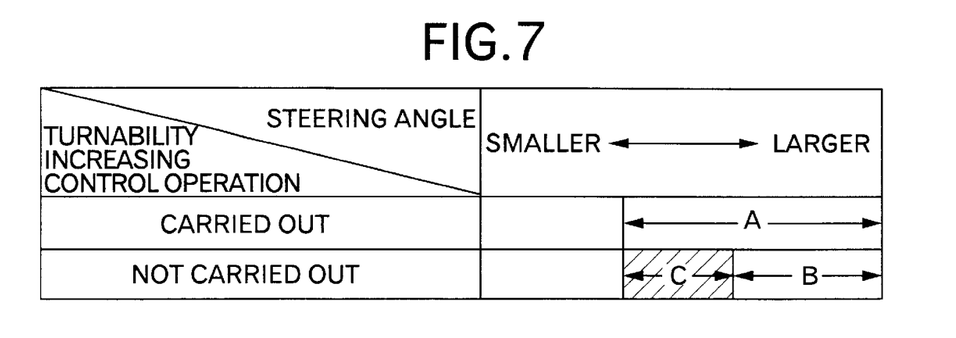
FIG. 7 is a view for explaining a technique for determining whether turnability increasing control is possible.

FIG. 7 is a graph showing the above-described determining technique. When the turnability increasing control operation is to be carried out, the avoidance of the obstacle is possible if the steering angle is in a range indicated by a region A. When the turnability increasing control operation is not to be carried out, the avoidance of the obstacle is possible if the steering angle is in a range indicated by a region B. A region C indicated by oblique lines shows a region where if the turnability increasing control operation is not to be carried out, the obstacle cannot be avoided, and when the turnability increasing control operation is to be carried out, the obstacle can be avoided. When the steering angle is in the region C, the carrying-out of the turnability increasing control operation is permitted.

2. Technique Using A Map (1) An avoidable area, when the turnability increasing control operation is to be carried out, is searched by a six-dimensional map using, as parameters, the vehicle speed detected by the wheel speed sensors $S_7$ to $S_{10}$, the relative distance and speed and the direction of the obstacle detected by the obstacle sensor $S_1$, the steering angle detected by the steering angle sensor $S_3$ and the road surface friction coefficient detected by the road surface coefficient sensor $S_4$; and (2) An avoidable area, when the turnability increasing control operation is not be carried out, is searched using the above six-dimensional map;

(3) When the vehicle has entered the area searched in the item (1), but has not entered the area searched in the item (2), namely, when it is impossible to avoid the obstacle, if the turnability increasing control operation is not to be carried out, and it is possible to avoid the obstacle, if the turnability increasing control operation is to be carried out, the avoidance-possibility or impossibility determining means M6 determines that it is possible to avoid the obstacle, thereby permitting the carrying-out of the turnability increasing control operation.

When the avoidance-possibility or impossibility determining means M6 permits the carrying-out of the turnability increasing control operation in the above manner, the vehicle behavior control means M5 increases the turnability of the vehicle V in the following manner to avoid the obstacle. Techniques for the turnability increasing control operation include a technique using the brake devices $1_{FL}$, $1_{FR}$, $1_{RL}$ and $1_{RR}$, a technique using the rear wheel steering actuators $3_L$ and $3_R$, a technique using the front suspensions $4_L$ and $4_R$, and a technique using the rear suspensions $5_L$ and $5_R$. The contents of these techniques will be described below.

1. Technique Using Brake Devices

When the vehicle V is turned leftwards to avoid the obstacle, the braking forces of the brake devices $1_{FL}$ and $1_{RL}$ for the left front wheel $W_{FL}$ and the left rear wheel $W_{RL}$ are increased and at the same time, the braking forces of the brake devices $1_{FR}$ and $1_{RR}$ for the right front wheel $W_{FR}$ and the right rear wheel $W_{RR}$ are decreased, thereby generating a leftward yaw moment to assist in the leftward turning of the vehicle V. On the other hand, when the vehicle V is turned rightwards to avoid the obstacle, the braking forces of the brake devices $1_{FR}$ and $1_{RR}$ for the right front wheel $W_{FR}$ and the right rear wheel $W_{RR}$ are increased and at the same time, the braking forces of the brake devices $1_{FL}$ and $1_{RL}$ for the left front wheel $W_{FL}$ and the left rear wheel $W_{RL}$ are decreased, thereby generating a rightward yaw moment to assist in the rightward turning of the vehicle V.

2. Technique Using Rear Steering Actuators

The left and right rear wheels $W_{RL}$ and $W_{RR}$ are steered in the same phases as the left and right front wheels $W_{FL}$ and $W_{FR}$ with a primary relay factor by the rear wheel actuators $3_L$ and $3_R$, thereby assisting in the turning of the vehicle V. Alternatively, the left and right rear wheels $W_{RL}$ and $W_{RR}$ are steered only in a moment in the phases opposite from the left and right front wheels $W_{FL}$ and $W_{FR}$ with a primary advance factor by the rear wheel actuators $3_L$ and $3_R$ and then steered in the same phases as the left and right front wheels $W_{FL}$ and $W_{FR}$ in such a manner that the reduction in yaw rate gain is compensated, thereby assisting in the turning of the vehicle V.

3. Technique Using Front Suspension and Rear Suspension

The spring constant of each of the suspending springs of the front suspensions $4_L$ and $4_R$, the damping force of the damper, the rigidity of the stabilizer and the like, are decreased to decrease the rolling rigidity on the front side, and the spring constant of each of the suspending springs of the rear suspensions $5_L$ and $5_R$, the damping force of the damper, the rigidity of the stabilizer and the like, are increased to increase the rolling rigidity on the rear side, thereby assisting in the turning of the vehicle V with the rolling rigidity distributed to the rear side. Alternatively, the balance of the rolling rigidities of the front suspensions $4_L$ and $4_R$ and the rear suspensions $5_L$ and $5_R$ is dynamically controlled by timing when the load is moved to front and rear axles immediately after the driver operates the steering wheel 2, thereby assisting the turning of the vehicle V with the steering characteristic of over-steering.

Even if the above-described turnability increasing control operation is to be carried out, it is impossible to carry out the turnability increasing control operation, if no space exists in a direction of turning of the vehicle. For this reason, the avoiding space detecting means M7 detects whether avoiding spaces (see areas indicated by oblique lines in FIG. 6) exist laterally ahead of the vehicle, based on the signal from the avoiding space sensor $S_6$. Only when the avoiding space exists, is the carrying-out of the turnability increasing control operation permitted. When no avoiding space exists, the avoidance of the obstacle by the turning of the vehicle is not used, and the vehicle behavior control means M5 carries out a stability increasing control operation, so that the avoidance of the obstacle by the automatic braking operation can be carried out more effectively. The stability increasing control operation is intended for carrying out the automatic braking operation effectively with an enhanced linearity of the vehicle V. Techniques for the stability increasing control operation include a technique using the brake devices $1_{FL}$, $1_{FR}$, $1_{RL}$ and $1_{RR}$, a technique using the rear steering actuators $3_L$ and $3_R$, and a technique using the front suspensions $4_L$ and $4_R$ and the rear suspensions $5_L$ and $5_R$. The contents of these techniques will be described below.

1. Technique Using Brake Devices

When the driver operates the steering wheel 2 to the right, the braking forces of the brake devices $1_{FL}$ and $1_{RL}$ for the left front wheel $W_{FL}$ and the left rear wheel $W_{RL}$ are increased and at the same time, the braking forces of the brake devices $1_{FR}$ and $1_{RR}$ for the right front wheel $W_{FR}$ and the right rear wheel $W_{RR}$ are decreased, thereby generating a leftward yaw moment to increase the linearity of the vehicle V. On the other hand, when the driver operates the steering wheel 2 to the left, the braking forces of the brake devices $1_{FR}$ and $1_{RR}$ for the right front wheel $W_{FR}$ and the right rear wheel $W_{RR}$ are increased and at the same time, the braking forces of the brake devices $1_{FL}$ and $1_{RL}$ for the left front wheel $W_{FL}$ and the left rear wheel $W_{LR}$ are decreased, thereby generating a rightward yaw moment to increase the linearity of the vehicle V.

2. Technique Using Rear Steering Actuators

The left and right rear wheels $W_{RL}$ and $W_{RR}$ are steered simultaneously by the rear steering actuators $3_L$ and $3_R$, with and in the same phases as the left and right front wheels $W_{FL}$ and $W_{FR}$, with the steering angle proportional to the steering angle of the front wheels $W_{FL}$ and $W_{FR}$ thereby increasing the linearity of the vehicle V.

3. Technique Using Front Suspensions and Rear Suspensions

The spring constant of the suspending spring of each of the front suspensions $4_L$ and $4_R$, the damping force of the damper, the rigidity of the stabilizer and the like, are increased to increase the rolling rigidity on the front side and at the same time, the spring constant of the suspending spring of each of the rear suspensions $5_L$ and $5_R$, the damping force of the damper, the rigidity of the stabilizer and the like, are decreased to decrease the rolling rigidity on the rear side, thereby distributing the rolling rigidity to the front side, and increasing the linearity of the vehicle.

Alternatively, the balance of the rolling rigidities of the front suspensions $4_L$ and $4_R$ and the rear suspensions $5_L$ and $5_R$, is dynamically controlled with a timing when the load is moved to the front and rear axles immediately after the driver operates the steering wheel 2, thereby increasing the linearity of the vehicle V with a steering characteristic of under-steering.

Figure 8:
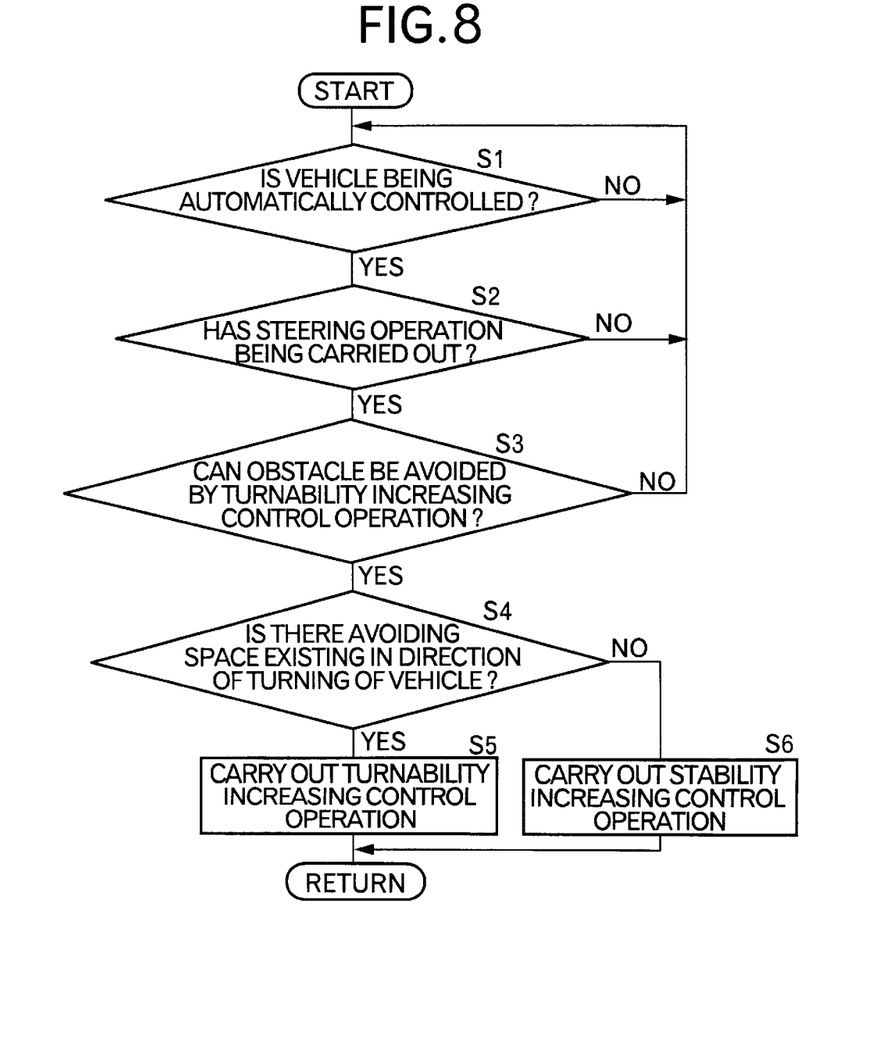
FIG. 8 is a flow chart for explaining the operation.

The above-described operation will be summarized below based on the flow chart shown in FIG. 8. If the vehicle V is being automatically controlled at Step S1; the steering operation is carried out by the driver at Step S2; it is determined at Step S3 that the obstacle can be avoided by the turnability increasing control operation at Step S3, and an avoiding space exists in a direction of turning of the vehicle V at Step S4; the turnability increasing control operation is carried out to avoid the obstacle by the steering operation at Step S5. If no avoiding space exists in the direction of turning of the vehicle V at Step S4, the avoidance of the obstacle by the steering operation is not used, and the stability increasing control operation is carried out to effectively perform the avoidance of the obstacle by the automatic braking operation at Step S6.

When the driver has carried out the steering operation to spontaneously avoid the obstacle during the automatic braking operation for avoiding contact of the vehicle with the obstacle, if it is possible to avoid the obstacle by the turnability increasing control operation caused by the steering operation, the carrying-out of the turnability increasing control operation is permitted. Therefore, the spontaneous avoidance of the obstacle based on the driver's intention, can be preferentially carried out to the maximum to further reliably prevent contact of the vehicle with the obstacle, while effectively balancing the avoidance of the contact provided by the automatic braking operation and the avoidance of the contact provided by the steering operation.

If no avoiding space exists in the direction of turning of the vehicle V, the carrying-out of the turnability increasing control operation is prohibited and hence, the wasteful turnability increasing control operation can be prevented from being carried out. Moreover, if the obstacle cannot be avoided by the steering operation due to the existence of no avoiding space, the stability increasing control operation is carried out in place of the turnability increasing control operation to enhance the stability of the straight movement of the vehicle V. Therefore, the braking force in the automatic braking operation can be effectively exhibited to reliably achieve the avoidance of contact by the automatic braking operation.

As discussed above, when the driver performs the steering operation during the automatic braking operation by the automatic braking means, the carrying-out of the turnability increasing control operation is permitted, if it is possible to avoid an obstacle by the turnability increasing control operation provided by the vehicle behavior control means. Therefore, the reliable obstacle avoiding operation based on the driver's intention can be carried out to the maximum to effectively prevent the contact of the vehicle with the obstacle, while effectively balancing the avoidance of the contact provided by the automatic braking operation and the avoidance of the contact provided by the steering operation.

The operation for avoiding the obstacle by the vehicle behavior control means is permitted, only when an avoiding space exists in the direction for the vehicle to avoid the obstacle. Therefore, when no avoiding space exists, the wasteful avoiding operation is prevented from being carried out.

When it is impossible to avoid the obstacle by the steering operation due to no space existing in the direction for the vehicle to avoid the obstacle, the vehicle behavior control means performs the operation for inhibiting the change in behavior of the vehicle. Therefore, the stability of the straight movement of the vehicle can be enhanced, and the braking effect by the automatic braking operation can be exhibited effectively to reliably avoid the obstacle.

Further, a difference can be provided between braking forces for the left and right wheels of the vehicle to generate a yaw moment, and the turnability of the vehicle can be enhanced by this yaw moment. The turnability of the vehicle can also be enhanced by steering the four wheels, i.e., by steering the rear wheels in addition to the steering of the front wheels. In addition, the turnability of the vehicle can also be enhanced by providing a difference between the rolling rigidity of the suspension for the front wheels and the rolling rigidity of the suspension for the rear wheels.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of. equivalency of the claims are, therefore, to be embraced therein.

What is claimed is:

1. An obstacle avoidance control system for a vehicle, comprising an obstacle detecting device for detecting an obstacle existing ahead of the vehicle in the direction of movement of the vehicle, a contact-possibility determining means for determining whether there is a possibility that the vehicle will contact the obstacle, based on the result of the determination provided by the obstacle detecting device, an automatic braking means for carrying out an automatic braking operation, when the contact-possibility determining means determines that there is a possibility that the vehicle will contact the obstacle, a steering operation detecting means for detecting the steering operation provided by the driver of the vehicle, a vehicle behavior control means for assisting in the steering operation of the driver to enhance the turnability of the vehicle, and an avoidance-possibility or impossibility determining means for determining whether it is possible to avoid the obstacle by the operation of the vehicle behavior control means, when the steering operation detecting means detects the steering operation of the driver during the automatic braking operation by the automatic braking means, wherein when the avoidance-possibility or impossibility determining means determines that it is possible to avoid the obstacle, the operation for avoiding the obstacle by the vehicle behavior control means is permitted.

2. An obstacle avoidance control system for a vehicle according to claim 1, further including an avoiding space detecting device for detecting whether an avoiding space exists in a direction for the vehicle to travel to avoid the obstacle, wherein when the avoiding space detecting device determines that the avoiding space exists, the operation for avoiding the obstacle by the vehicle behavior control means is permitted.

3. An obstacle avoidance control system for a vehicle according to claim 2, wherein when the avoiding space detecting device determines that no avoiding space exists, the vehicle behavior control means performs an operation for suppressing a change in the behavior of the vehicle.

4. An obstacle avoidance control system for a vehicle according to claim 1, wherein the vehicle behavior control means enhances the turnability of the vehicle by changing the distribution of the braking forces to the left and right sides of the vehicle.

5. An obstacle avoidance control system for a vehicle according to claim 1, wherein the vehicle behavior control means enhances the turnability of the vehicle by steering the rear wheels of the vehicle.

6. An obstacle avoidance control system for a vehicle according to claim 1, wherein the vehicle behavior control means enhances the turnability of the vehicle by changing the distribution of the rolling rigidities to the front and rear sides of the vehicle.

* * * * *